(12) United States Patent
Noguchi

(10) Patent No.: US 7,391,965 B2
(45) Date of Patent: Jun. 24, 2008

(54) LENS APPARATUS AND IMAGE-TAKING APPARATUS

(75) Inventor: Kazuhiro Noguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 11/197,177

(22) Filed: Aug. 3, 2005

(65) Prior Publication Data

US 2006/0029378 A1 Feb. 9, 2006

(30) Foreign Application Priority Data

Aug. 5, 2004 (JP) ............................. 2004-229034

(51) Int. Cl.
*G03B 17/00* (2006.01)
*G03B 17/02* (2006.01)
*G03B 17/04* (2006.01)

(52) U.S. Cl. .......................... 396/72; 396/439; 396/478; 359/699; 359/700; 359/701; 359/702; 359/703; 359/704; 359/705; 359/706

(58) Field of Classification Search .................. 396/72, 396/60, 359, 439, 478; 359/699–706
See application file for complete search history.

(56) References Cited

U.S. PATENT DOCUMENTS 5,809,348 A * 9/1998 Nomura et al. ................ 396/72

2003/0081948 A1 * 5/2003 Nomura et al. ................ 396/72
2003/0180036 A1 * 9/2003 Horiuchi et al. ............... 396/72
2004/0125225 A1 * 7/2004 Noguchi ..................... 348/335

FOREIGN PATENT DOCUMENTS

JP 2002-090611 3/2002

* cited by examiner

*Primary Examiner*—W. B. Perkey
*Assistant Examiner*—Anthony Weathers
(74) *Attorney, Agent, or Firm*—Morgan & Finnegan, LLP

(57) ABSTRACT

A lens apparatus is disclosed, which is capable of keeping the engagement of a protruding portion of a first member and a cam groove portion of a second member even if an external force acts on the apparatus. The lens apparatus comprises: a first member including first and second protruding portions; and a second member including a first groove portion with which the first protruding portion engages, and a second groove portion into which the second protruding portion is inserted. The second protruding portion and the second groove portion are away from each other in a case where the first and second members are located in a specified positional relationship, and come into contact with each other in a case where the first and second members are located in another positional relationship.

4 Claims, 8 Drawing Sheets

LENS APPARATUS AND IMAGE-TAKING APPARATUS

FIELD OF THE INVENTION

The present invention relates to a lens apparatus which includes a member having a protruding portion and a member having a groove portion that the protruding portion engages with, the members being moved relatively by their relative rotation, and an image-taking apparatus with the same.

BACKGROUND OF THE INVENTION

In compact film cameras and digital still cameras equipped with an image-pickup element such as a CCD sensor, a so-called collapsible lens apparatus is provided for good portability, which is housed in the camera body in a non-image-taking state.

In such a collapsible lens barrel, a barrel member is movable in a direction of the optical axis by the engagement of a cam groove portion and a cam follower pin.

When the lens barrel is in a protruded state (image-taking state), there is a possibility that the front barrel will receive a strong impact in a case where the camera is dropped or collides with something in a state in which the camera is hung with a strap. Therefore, a lens barrel has been disclosed in Japanese Patent Laid-Open application 2002-90611, which has a structure capable of preventing the disengagement of the cam groove portion and cam follower pin.

In the lens barrel disclosed in Japanese Patent Laid-Open application 2002-90611, the disengagement of a tapered roller for cam driving from the cam groove portion is prevented by the contact of a cylindrical roller, which is provided separately from the tapered roller, with a disengagement preventing groove portion.

However, in the lens barrel disclosed in Japanese Patent Laid-Open application 2002-90611, the tapered roller and the cylindrical roller are arranged in the optical axis direction. In this case, when an external force acts on the lens barrel, the lens barrel is deformed, and thereby the tapered roller is displaced along the sidewall of the cam groove portion and the cylindrical roller is also displaced. Consequently, the contact area of the cylindrical roller and the disengagement preventing groove portion is reduced. This is not preferable for ensuring the strength of the lens barrel.

BRIEF SUMMARY OF THE INVENTION

One object of the present invention is to provide a lens apparatus capable of keeping the engagement of a protruding portion provided in a first member and a cam groove portion provided in a second member even if an external force acts on the lens barrel, and to provide an image-taking apparatus with the same.

A lens apparatus that is one aspect of the present invention is a lens apparatus which comprises: a first member which includes a first protruding potion and a second protruding portion; and a second member which includes a first groove portion with which the first protruding portion engages, and a second groove portion into which the second protruding portion is inserted. The second protruding portion and the second groove portion are away from each other in a case where the first and second members are located in a specified positional relationship in a direction orthogonal to an optical axis, and come into contact with each other in a case where the first and second members are located in a positional relationship other than the specified positional relationship.

A lens apparatus that is another aspect of the present invention is a lens apparatus which comprises: a first member which includes a first protruding potion having a tapered shape; and a second member which includes a first groove portion that is a cam groove portion with which the first protruding portion engages, the first and second members being moved relatively in a direction of an optical axis by their relative rotation. The first member includes a second protruding portion having one of a tapered shape with a taper angle smaller than that of the first protruding portion and a non-tapered shape, and the second member includes a second groove portion into which the second protruding portion is inserted.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

The description will be given of a lens barrel (lens apparatus) that is an embodiment of the present invention. The image-taking optical system in the lens barrel of this embodiment is constituted by four lens units including a convex lens unit, a concave lens unit, a convex lens unit and a convex lens unit in order from an object side. Further, the lens barrel of this embodiment is a collapsible lens barrel whose total length becomes shorter by shortening the distances between the four lens units in a non-use state (non-image-taking state) than in an in-use state (image-taking state).

Figure 1:
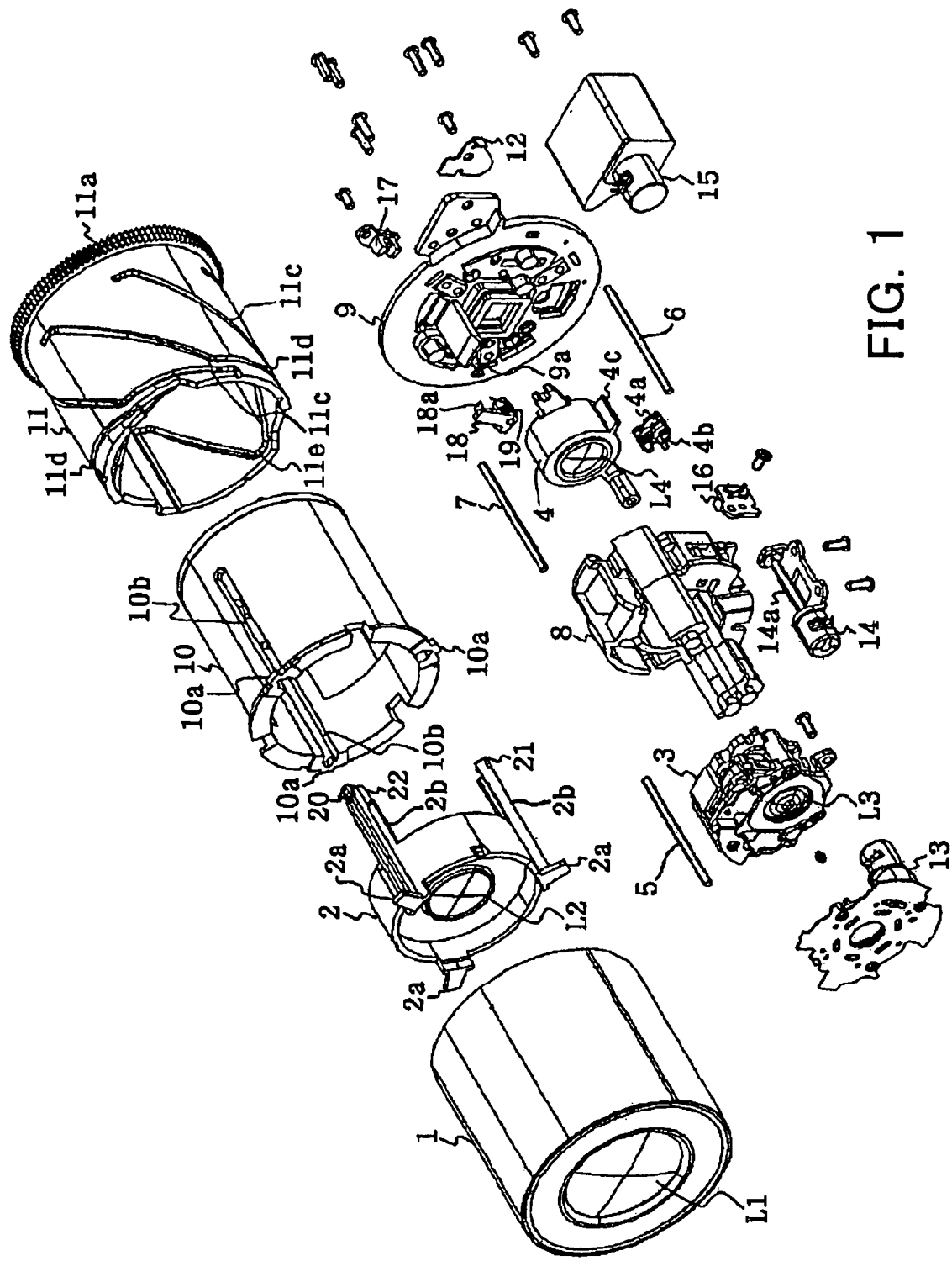
FIG. 1 is an exploded perspective view showing the structure of a lens barrel that is an embodiment of the present invention.
Figure 2:
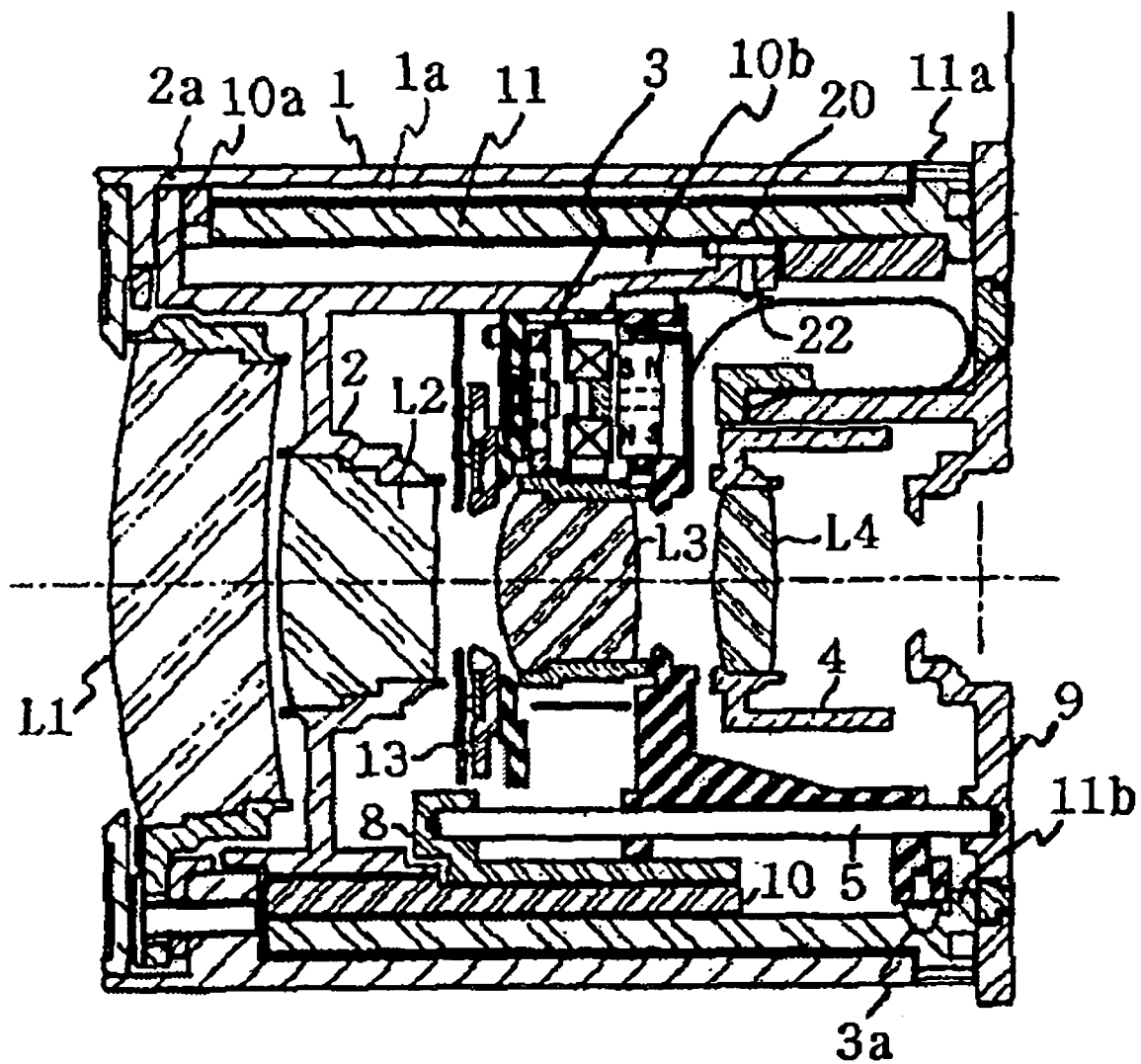
FIG. 2 is a sectional view showing the lens barrel of the embodiment in a collapsed state.
Figure 3:
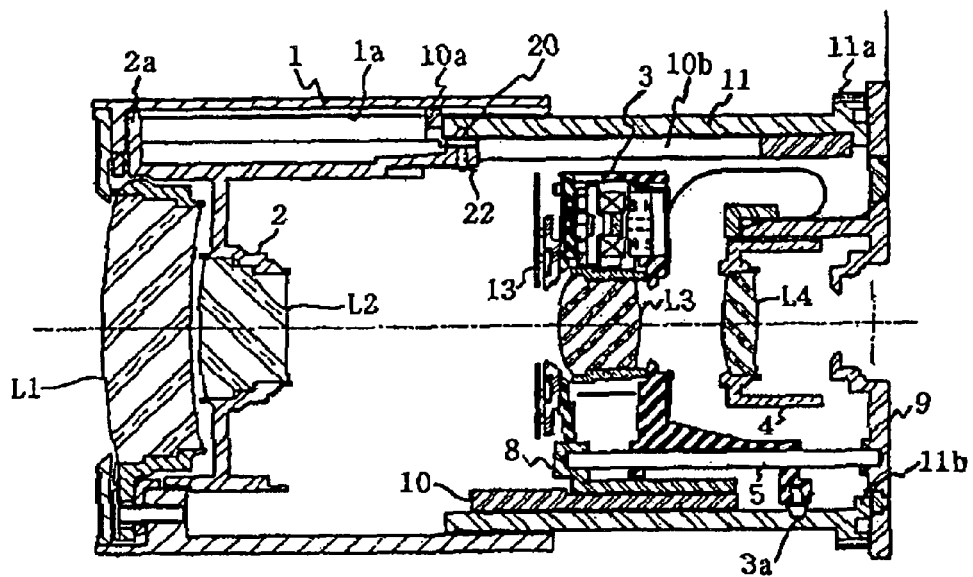
FIG. 3 is a sectional view showing the lens barrel of the embodiment in a wide-angle state.
Figure 4:
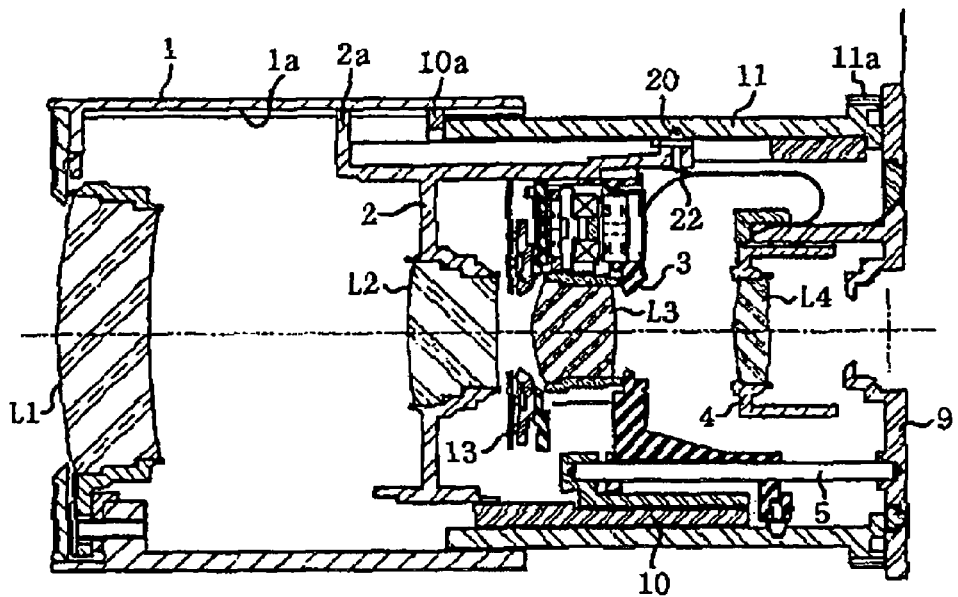
FIG. 4 is a sectional view showing the lens barrel of the embodiment in a telephoto state.

FIG. 1 is an exploded perspective view showing the structure of the lens barrel of this embodiment, FIG. 2 is a sectional view showing the lens barrel in a collapsed state. FIG. 3 is a sectional view showing the lens barrel in a wide-angle state, and FIG. 4 is a sectional view showing the lens barrel in a telephoto state.

In these figures, L1 denotes a first lens unit, L2 a second lens unit. L3 denotes a third lens unit for correcting an image blurring by its movement in a direction substantially orthogonal to the optical axis. L4 denotes a fourth lens unit for performing focusing by its movement in the optical axis direction.

1 denotes a first barrel which is a first member and holds the first lens unit L1, 2 a second barrel holding the second lens unit L2. 3 denotes a shift unit holding the third lens unit L4 and moving the third lens unit L4 in the direction substantially orthogonal to the optical axis.

3a denotes a cam pin having a tapered surface and being fixed to the rear end portion of the shift unit 3 by press fitting or the like. 4 denotes a movable frame holding the fourth lens unit 4.

5, 6 and 7 denote guide bars extending in the optical axis direction. The guide bars 5 and 6 support the shift unit 3 so that it can move in the optical axis direction. The guide bars 7 and 6 support the movable frame 4 so that it can move in the optical axis direction.

8 denotes a supporting frame for positioning and fixing one end (front side end in the lens barrel) of each of the guide bars 5, 6 and 7. 9 denotes a rear barrel for positioning and fixing the other end (rear side end in the lens barrel) of each of the guide bars 5, 6 and 7. An image-pickup element such as a CCD sensor or CMOS sensor is fixed to the rear barrel 9. The supporting frame 8 is fixed to the rear barrel 9 with three screws.

10 denotes a fixed barrel whose position in the optical axis direction is fixed. 11 denotes a cam barrel positioned in the optical axis direction by the rear barrel 9 and held rotatably around the optical axis with respect to the outer circumference of the fixed barrel 10.

In the inner circumferential wall surface and outer circumferential wall surface of the cam barrel that is a second member, a plurality of cam groove portions are formed. Cam follower pins engage with these cam groove portions, as described later.

12 denotes a stopper stopping the rotation of the cam barrel 11, and the stopper 12 is fixed to the rear barrel 9 with screws. When the cam barrel 12 rotates by a predetermined amount around the optical axis, the cam barrel 11 contacts the stopper 12 to stop a further rotation of the cam barrel 11.

13 denotes a diaphragm unit (iris diaphragm) having a plurality of light-shielding blades. Moving these light-shielding blades with respect to a fixed-light-passing aperture, which is formed in the diaphragm unit 13, changes the diameter of the light-passing aperture formed by the light-shielding blades, thereby making it possible to change the amount of light directing an image plane. Further, by switching the position of the light-shielding blades between an open position and the close position, the diaphragm unit functions as a shutter.

14 denotes a focus motor that is the driving source of the fourth lens unit L4, and has a lead screw 14a rotating together with its rotor. The lead screw 14a engages with a rack 4a provided on the movable frame 4, and the rack 4a is moved in the optical axis direction (longitudinal direction of the lead screw 14a) according to the rotation of the lead screw 14. Thereby the fourth lens unit L4 is moved in the optical axis direction.

A torsion coil spring 4b biases the rack 4a and movable frame 4 to one side to eliminate backlashes between the rack 4a and the lead screw 14a, and between the movable frame 4 and the guide bars 6 and 7. The focus motor 14 is fixed on the supporting frame 8 with two screws.

15 denotes a zoom motor that is a driving source for rotating the cam barrel 11. The zoom motor 15 is interlocked with a gear portion 11a formed at the rear end of the cam barrel 11 via a reduction mechanism (not shown in the figure). The driving force of the zoom motor 15 is transmitted to the cam barrel, thereby rotating the cam barrel 11 around the optical axis.

A zoom operation is performed by the rotation of the cam barrel 11 around the optical axis, as described later. The zoom motor 15 is fixed on the rear barrel 9 with two screws.

16 denotes a photoelectric detector having a light-emitting portion and a light-receiving portion that receives light from the light-emitting portion. A light-shielding portion 4c provided on the movable frame 4 is moved into and out of the gap between the light-emitting portion and the light-receiving portion according to the movement of the movable frame 4 in the optical axis direction, and the movement of the light-shielding portion 4c switches the state of the photoelectric detector 16 between a light-shielding state and a light-receiving state.

The photoelectric detector 16 is used for detecting the reference position of the fourth lens unit L4 and functions as a focus reset switch since it outputs a signal according to the switching between the light-shielding state and the light-receiving state.

17 denotes a photoelectric detector, and its state switches between a light-receiving state and a light-shielding state according to the rotation of a lever 18 as described later. The photoelectric detector 17 is used for detecting the reference position of the zoom operation and functions as a zoom reset switch since it outputs a signal according to the switching between the light-receiving state and the light-shielding state.

The lever 18 engages rotatably with a pin 9a provided on the rear barrel 9. The lever 18 contacts a cam portion 11b shown in FIGS. 2 and 3 by receiving a biasing force from a torsion coil spring 19. The cam portion 11b is formed on the inner circumferential surface of the cam barrel 11, and extends inward in a direction of the barrel's diameter.

When the cam barrel 11 rotates around the optical axis, the lever 18 is rotated around the pin 9a by being pushed by the cam portion 11b. A light-shielding portion 18a formed on the lever 18 is moved with respect to the photoelectric detector 17.

Using an output signal from the photoelectric detector 17 at the time of switching from the light-receiving state to the light-shielding state makes it possible to detect the rotation angle of the cam barrel 11.

Next, the description will be given of the supporting structure of the first and second lens unit L1 and L2.

Figure 5:
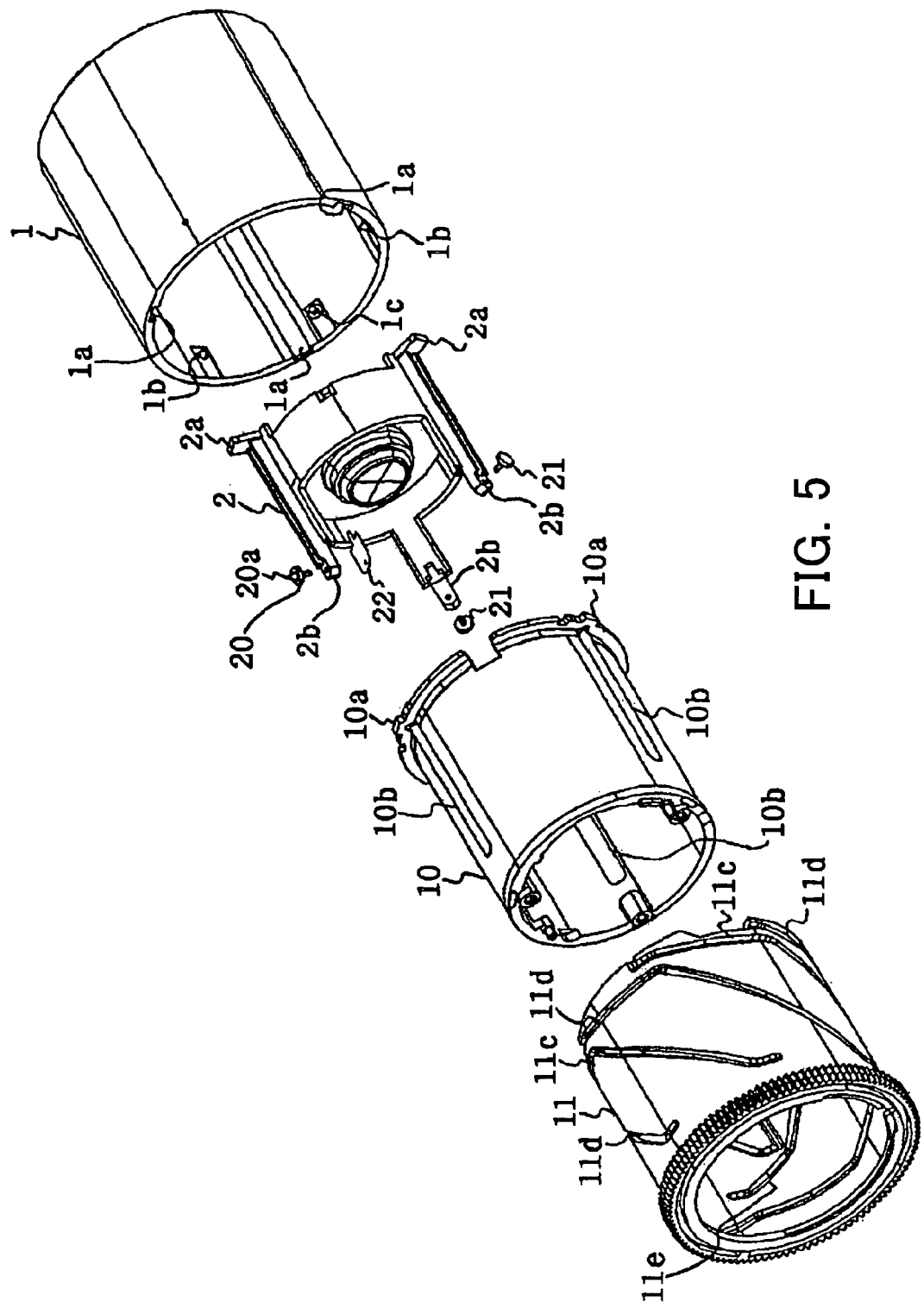
FIG. 5 is an exploded perspective view showing the supporting structure of a first and second barrel in the lens apparatus of the embodiment.

FIG. 5 is an exploded perspective view showing the supporting structure of the first and second lens unit L1 and L2 when viewed from the rear side of the lens barrel.

At the front end of the fixed barrel 10, three splines 10a are formed equiangularly in the circumferential direction of the fixed barrel 10. On the inner circumferential wall surface of the first barrel 1, three straight groove portions 1a extending in the optical axis direction are formed. The straight groove portions 1a engage with the splines 10a.

The engagement of the three splines 10a and the three straight groove portions 1a permits the first barrel 1 to move with respect to the fixed barrel 10 only in the optical axis direction without rotating around the optical axis.

At the rear end of the first barrel 1, three cam follower pins 1b that are first protruding portion and three impact-resistant pins 1c that are second protruding pins are fixed by press fitting or the like. These cam follower pins 1b and impact-resistant pins 1c are arranged alternately and equiangularly in the circumferential direction of the first barrel 1. Each of the cam follower pins 1b and impact-resistant pins 1c has a taper surface at the tip thereof.

The three cam follower pins 1b engage with three cam groove portions 11c, respectively, and the three impact-resistant pins 1c engage with three cam groove portions 11d, respectively, the cam groove portions 11c and 11d being formed on the outer circumferential surface of the cam barrel 11. The cam groove portion 11c has a shape corresponding to the shape of tip of the cam follower pins 1b, and the cam groove portion 11d has a shape corresponding to the shape of tip of the impact-resistant pin 1c. In other words, the sidewalls of the cam groove portions 11c and 11d have a tapered surface.

Engaging the cam follower pins 1b and impact-resistant pins 1c with the cam groove portions 11c and 11d makes it possible to prevent the first lens unit from tilting with respect to the optical axis.

Further, when the cam barrel 11 rotates around the optical axis, the first barrel 1 is moved with respect to the cam barrel 11 in the optical axis direction by a camming action of the cam groove portions 11c and 11d engaging with the cam follower pin 1b and impact-resistant pin 1c, respectively.

The cam tracks of the cam groove portions 11c and 11d, which are formed at different phase positions on the outer circumferential surface of the cam barrel 11, substantially coincide with each other.

The cam follower pin 1b consistently engages with the cam groove portion 11c regardless of whether the lens barrel is in the collapsed state (non-image-taking state) or the protruding state (image-taking state). The tip of the impact-resistant pin 1c (portion that engages with the cam groove portion 11d) is formed in a generally cylindrical shape.

The tip of the impact-resistant pin 1c is located in the cam groove portion 11d, and away from the sidewall of the cam groove portion 11d without engaging with the cam groove portion 11d in a state in which an external force does not act on the lens barrel (first barrel 1), that is, a state in which the first barrel 1 and the cam barrel 11 are located in a specific positional relationship.

When an external force (impact) acts on the first barrel 1 as in the case where the camera equipped with the lens barrel of this embodiment is dropped, the cam follower pin 1b is moved along the sidewall of the cam groove portion 11c in a direction in which the cam follower pin 1b may disengage from the cam groove portion 11c. However, at this time, the impact-resistant pin 1c engages with the cam groove portion 11d, thereby preventing the cam follower pin 1b from disengaging from the cam groove portion 11c.

In other words, according to this embodiment, since the impact-resistant pin 1c, which is the second protruding portion, contact the cam groove portion 11d when the external force acts on the lens barrel, it is possible to keep the engaging state of the cam follower pin 1b, which is the first protruding portion, and the cam groove portion 11c.

Next, the detailed description will be given of the behavior of the first barrel 1 on which the external force acts with reference to FIG. 8.

Figures 8C, 8D:
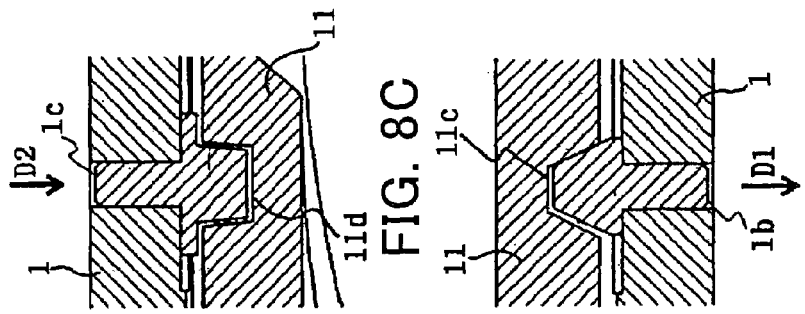
FIGS. 8A to 8E are explanatory drawings showing the behavior of the first barrel when an external force acts on it.
Figures 8B, 8E:
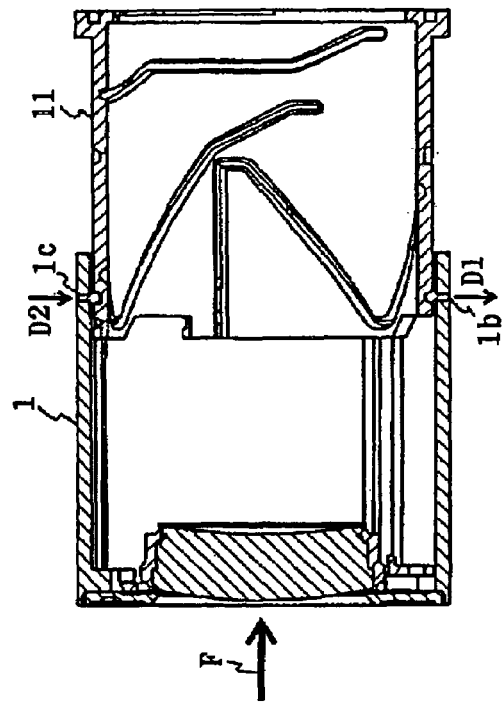
Figure 8A:
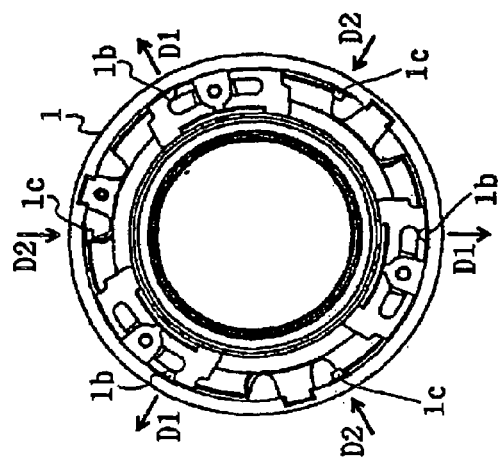

FIG. 8A shows the first barrel 1 when viewed from the rear side. The cam follower pins 1b and impact-resistant pins 1c are arranged alternately and equiangularly in the circumferential direction of the first barrel 1.

FIG. 8B is a sectional view of the first barrel 1 and cam barrel 11 in the optical axis direction, and shows a state of the engagement of the cam follower pin 1b and impact-resistant pin 1c with the cam groove portions 11c and 11d.

FIG. 8C is a partially sectional view showing the impact-resistant pin 1c and the cam groove portion 11d in a state in which the external force does not act on the first barrel 1. As shown in this figure, though the impact-resistant pin 1c is located in the cam groove portion 11d, the impact-resistant pin 1c does not contact the sidewall of the cam groove portion 11d.

FIG. 8D is a partially sectional view showing the cam follower pin 1b and the cam groove portion 11c. As shown in this figure, the cam follower pin 1b contact a part of the sidewall of the cam groove portion 11c.

As shown in FIGS. 8C and 8D, the taper angle of the cam follower pin 1b is larger than that of the impact-resistant pin 1c. The taper angle is an angle θ of the tapered surface with respect to the central axis of the pin, as shown in FIG. 8E.

Although the impact-resistant pin 1c has a tapered surface in this embodiment, the impact-resistant pin may be formed in a non-tapered shape, that is, a substantially cylindrical shape.

As shown in FIG. 8B, when the external force acts on the front end of the first barrel 1 in the direction shown by the arrow F, the cam follower pin 1b is moved along the sidewall of the cam groove portion 11c because they have the tapered surfaces. Thereby, the cam follower pin 1b is displaced outward in the diameter direction of the first barrel 1, as shown by the arrow D1.

Then, the first barrel 1 deforms elastically with the displacement of the cam follower pin 1b, and its shape of cross section in the direction orthogonal to the optical axis thereby becomes a generally triangular shape.

At this time, the three impact-resistant pins 1c, which are arranged respectively between the three cam follower pins 1b, are displaced in the direction shown by the arrow D2, or inward in the diameter direction of the first barrel 1, and contact the cam groove portion 11d.

As described above, when the external force shown by the arrow F in FIG. 8B acts on the first barrel 1, the contact area of the cam follower pin 1b and the cam groove portion 11c is reduced by the outward displacement of the cam follower pin 1b in the diameter direction of the first barrel 1. On the other hand, the impact-resistant pin 1c is displaced inward in the diameter direction of the first barrel 1 and contacts the cam groove portion 11d.

Therefore, since the impact-resistant pin 1c contacts the cam groove portion 11d even if the contact area of the cam follower pin 1b and the cam groove portion 11c reduces, it is possible to receive the external force by the contact area of the impact-resistant pin 1c and the cam groove portion 11d.

Consequently, it is possible to prevent the disengagement of the cam follower pin 1b from the cam groove portion 11c, which is caused by the action of the external force only on the cam follower pin 1b. Further, the contact of the impact-resistant pin 1c, which has been displaced inward in the diameter direction of the first barrel 1, with the cam groove portion 11d ensures a sufficient total contact area, thereby making it possible to increase the strength of the lens barrel.

As shown in FIG. 5, the second barrel 2 has three arm portions 2b extending in the optical axis direction. A cam follower pin 20 and two pins 21 are fixed on the tip of the arm portions 2b by press fitting or the like. The three arm portions 2b are provided equiangularly in the circumferential direction of the second barrel 2.

The fixed barrel 10 has three straight groove portions 10b extending in the optical axis direction. These straight groove portions 10b engage with the cylindrical portions of the pins 20 and 21. The three straight groove portions 10b and the pins 20 and 21 are provided with the same phase positional relationship. The pins 20 and 21 extend through the straight groove portion 10b and engage with a cam groove portion 11e formed on the inner circumferential surface of the cam barrel 11.

The engagement of the pins 20 and 21 with the straight groove portion 10b permits the second barrel 2 to move with respect to the fixed barrel 10 in the optical axis direction without rotating around the optical axis.

Three splines 2a are formed in the front end (object side end) of the second barrel 2, the spline 2a extending outward in the diameter direction of the second barrel 2. The three splines 2a are formed equiangularly in the circumferential direction of the second barrel 2.

The three splines 2a engage with the three straight groove portions 1a formed on the inner circumferential wall surface of the first barrel 1. Thereby, the rotation of the second barrel 2 with respect to the first barrel 1 around the optical axis is prevented, and thereby the second barrel 2 is positioned with respect to the first barrel 1 around the optical axis.

In the configuration described above, since the second barrel 2 engages with the fixed barrel 10 and first barrel 1 via the spline 2a and pins 20 and 21, the second barrel 2 is prevented from tilting with respect to the optical axis.

Here, when the first barrel 1 is displaced in the direction orthogonal to the optical axis due to backlashes of the engagement between the first barrel 1 and other members, unevenness of the shape of the groove portion and the like, the front side portion of the second barrel 2 follows to the first barrel 1. Thereby, it is possible to minimize the relative positional deviation of the first lens unit L1 held by the first barrel 1 and the second lens unit L2 held by the second barrel 2.

The cam follower pin 20 has a cone-shaped cam follower portion 20a having a tapered surface at its tip. The cam follower portion 20a engages constantly with one of the three cam groove portions 11e formed on the inner circumferential wall surface of the cam barrel 11.

When the cam barrel 11 rotates around the optical axis, the second barrel 2 is moved with respect to the cam barrel 11 and fixed barrel 1 in the optical axis direction by the engagement of the cam follower portion 20a and the cam groove portion 11e.

A leaf spring biases the cam follower pin 20 outward in the diameter direction of the second barrel 2 to make the cam follower portion 20a contact the cam groove portion 11e, thereby eliminating a backlash between the cam follower pin 20 and the cam groove portion 11e.

FIGS. 6A to 6D are enlarged views showing the engaging part of the second barrel 2 and cam barrel 11.

Figure 6A:
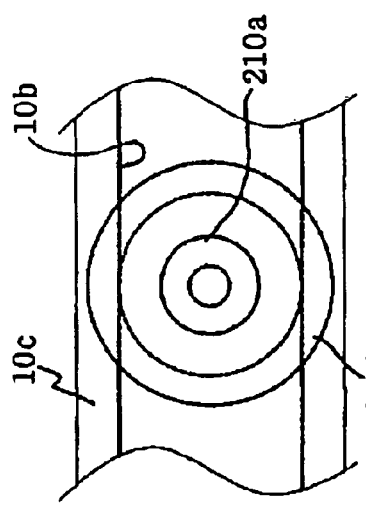
FIGS. 6A to 6D are enlarged view showing the supporting part of the second barrel.

FIG. 6A is a partially sectional view of the lens barrel of this embodiment, showing the engaging state of the cam follower pin 20, the cam groove portion 11e and the straight groove portion 10b. In this embodiment, the pin 21 does not have a portion corresponding to the cam follower portion 20a of the cam follower pin 20 as shown in FIG. 5, and the position of the second barrel 2 in the optical axis direction is determined only by the engagement of the cam follower portion 20a of the cam follower pin 20 and the cam groove portion 11e.

When an external force (impact) due to the camera's drop or the like acts on the second barrel 2, there is a possibility that the external force will act only on the cam follower pin 20, and thereby the cam follower portion 20a will disengage from the cam groove portion 11e.

Figure 6B:
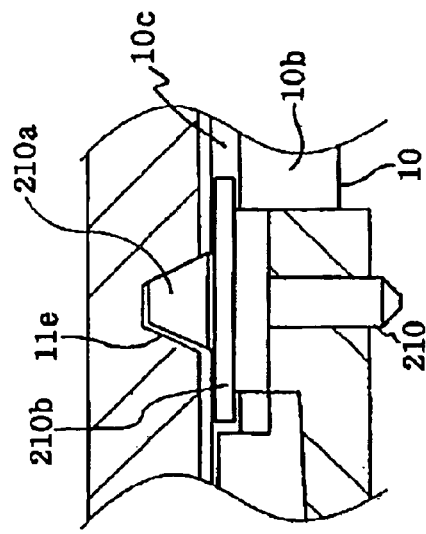

Here, a pin 200 having a shape shown in FIG. 6B can be used instead of the pin 21. The pin 200 has a tapered pin portion 200a which is located in the cam groove portion 11e in a normal in-use state in which an external force do not act on the second barrel 2. In other words, the tapered pin portion 200a does not contact the sidewall of the cam groove portion 11e in the normal in-use state.

The cam groove portion 11e engaging with the pin 200 has the same cam track as the cam groove portion 11e engaging with cam follower pin 20, and these cam groove portions 11e are formed at positions (phases) different from each other on the cam barrel 11.

In the configuration including the pin 200, when the cam follower portion 20a of the cam follower pin 20 comes close to disengaging from the cam groove portion 11e by the external force, the tapered pin portion 200a of the pin 200 contacts the cam groove portion 11e.

Consequently, it is possible to receive the external force evenly at the one cam follower pin 20 and two pins 200, thereby making it possible to increase the durability of the second barrel 2 against external impacts.

Figure 6C:
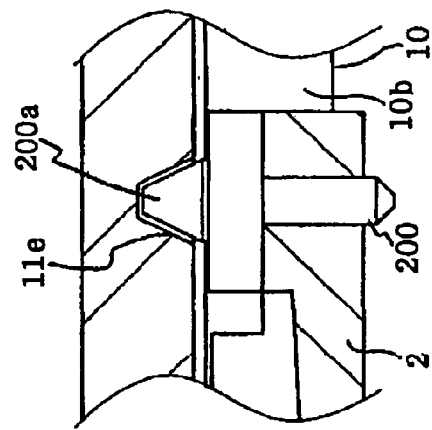
Figure 6D:
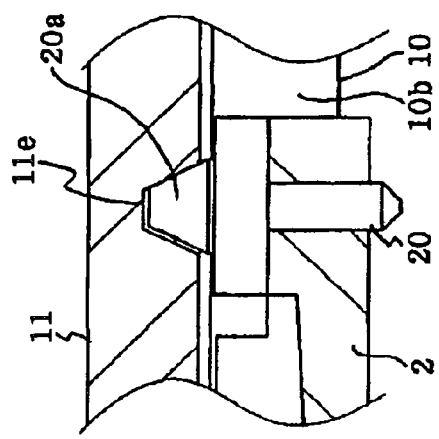

Further, as shown in FIGS. 6C and 6D, a step portion 10c can be formed in the straight groove portion 10b of the fixed barrel 10, and a cam follower pin 210 can be used instead of the pin 21, the pin 210 having a cam follower portion 210a engaging with the cam groove portion 11e and a flange portion 210b engaging with the step portion 10c.

In the configuration shown in FIGS. 6C and 6D, the external force can be received by the contact of the cam follower portion 20a of the cam follower pin 20 and the cam groove portion 11e, the contact of the cam follower portion 210a of the cam follower pin 210 and the cam groove portion 11e, and the contact of the flange portion 210b and the step portion 10c.

In this case, since the external force is received by the above-mentioned plural contact portions, it is possible to distribute the external force to the plural contact portions, thereby making it possible to increase the durability of the second barrel 2.

The three splines 2a formed at the front end of the second barrel 2 and the pins 20 and 21 are provided on the three arm portions 2b. In other words, the spline 2a and the pin 20 or 21 are provided at the same phase. The spline 10a and straight groove portion 10b formed on the fixes barrel 10 are provided at the same phase position in the circumferential direction of the fixed barrel 10.

In this embodiment, the spline 2a of the second barrel 2 and the spline 10a of the fixed barrel 10 are provide at the same phase position, and they engage with the same straight groove portion 1a. Therefore, it is possible to increase the mechanical strength of the first barrel 1 compared to the case where the splines 2a and 10a are formed at different phase positions on the inner circumferential surface of the first barrel 1 and a plurality of straight groove portions are formed in accordance with the phases of the splines 2a and 10a. In addition, making a flange portion (including the spline 10a) formed at the front end of the fixed barrel 10 thicker than a predetermined thickness makes it possible to increase the mechanical strength of the interlocking part of the fixed barrel 10 and the first barrel 1.

Figure 7:
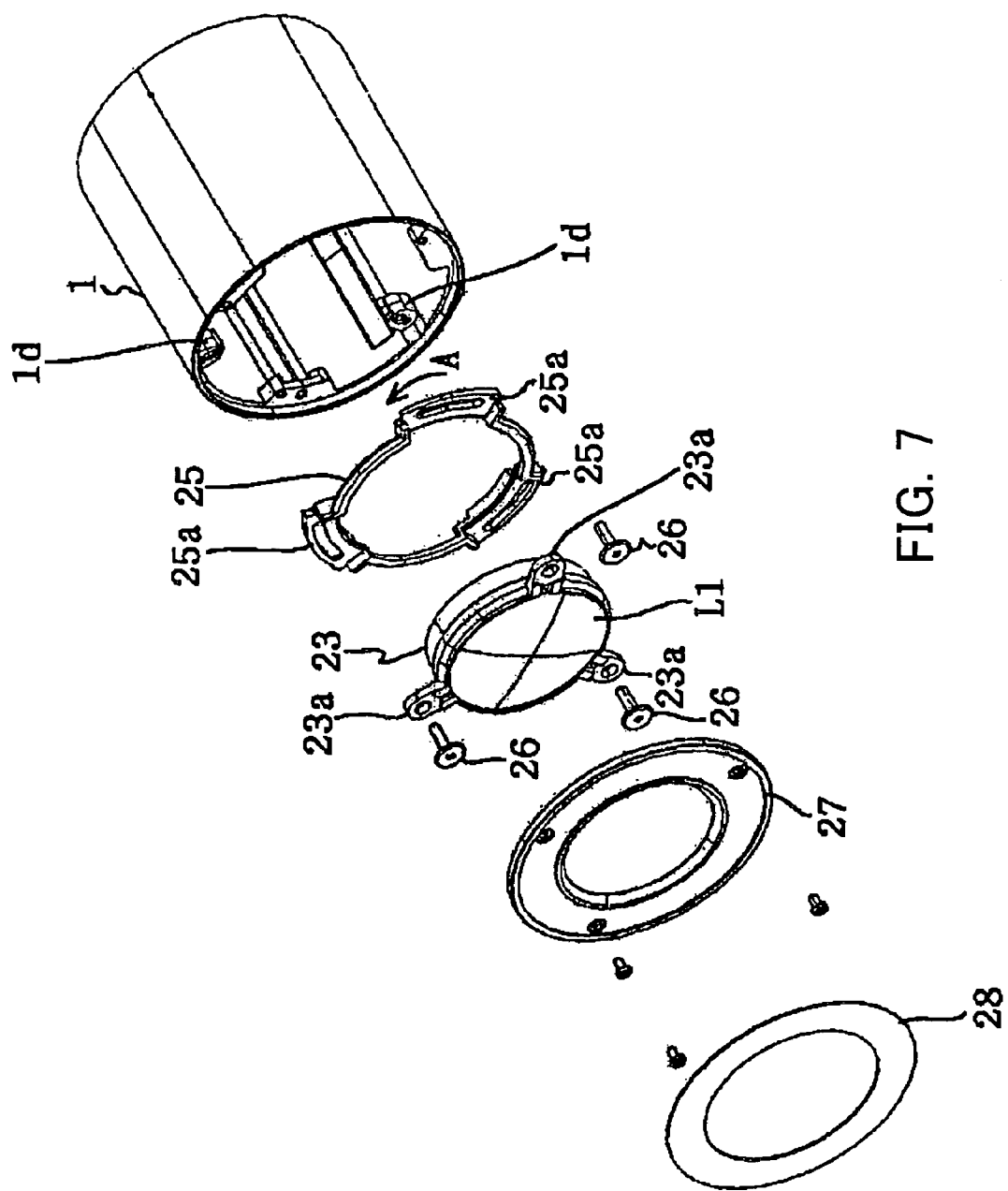
FIG. 7 is an exploded perspective view showing a unit including the first barrel.

Next, the description will be given of the structure of the unit including the first barrel 1 and the first lens unit L1 with reference to FIG. 7. FIG. 7 is an exploded perspective view of the above-mentioned unit.

23 denotes a lens holding frame holding the first lens unit L1. 25 denotes a intermediate ring fixed with three screws 26 by sandwiching between screw clamp portions 1d formed at the vicinity of the front end of the first barrel 1 and screw clamp portions 23a formed on the lens holding frame 23. The screw clamp portions 1d and 23a are formed equiangularly in the circumferential direction of the first barrel 1 and the lens holding frame 23, respectively.

The intermediate ring 25 has flange portions 25a contacting the screw clamp portions 23a formed on the lens the first barrel 1. The thickness of the flange portion 25a in the optical axis direction reduces gradually toward the direction shown by the arrow A in FIG. 7. In other words, of the flange portion 25a, the surface contacting the screw clamp portions 23a is a surface substantially orthogonal to the optical axis, and the surface contacting the screw clamp portions 1d is a tapered surface tilting with respect to a plane orthogonal to the optical axis.

In the above-mentioned configuration, rotating the intermediate ring 25 changes the position of the first lens unit L1 with respect to the first barrel 1 in the optical axis direction.

Further, there is a backlash between the screw 26 and a hole portion formed in the screw clamp portion 23a in the direction orthogonal to the optical axis (the diameter direction of the lens holding frame 23). Consequently, it is possible to slide the lens holding frame 23 with respect to the intermediate ring 25 in the direction orthogonal to the optical axis, thereby making it possible to adjust the position of the first lens unit L1 in the direction orthogonal to the optical axis Since the magnification varying optical system in the lens barrel of this embodiment is constituted by the four lens units, the variable magnification factor thereof is larger than a predetermined factor. Consequently, high position accuracy is required for each lens unit. Therefore, this embodiment adopts the structure in which the position of the first lens unit L1 is adjustable in the optical axis direction and the direction orthogonal thereto, as described above, for ensuring a predetermined optical performance.

The first barrel 1, lens holding frame 23 and intermediate ring 25 are fixed with the three screws 26 after the adjustment of their positions.

27 denotes a front mask having an opening. The front mask 27 is fixed to the first barrel 1 with screws. 28 denotes a decorative plate covering the screws for fixing the front mask 27. The decorative plate 28 is fixed to the front mask 27 by adhesion or the like.

In the lens barrel with the above-mentioned structure, as shown in FIGS. 2 to 4, the focal length of the image-taking optical system can be changed by changing the distances between the four lens units L1 to L4. Further, as shown in FIG. 2, the lens barrel can be housed into a camera body by minimizing the distances between the four lens units L1 to L4.

Figure 9:
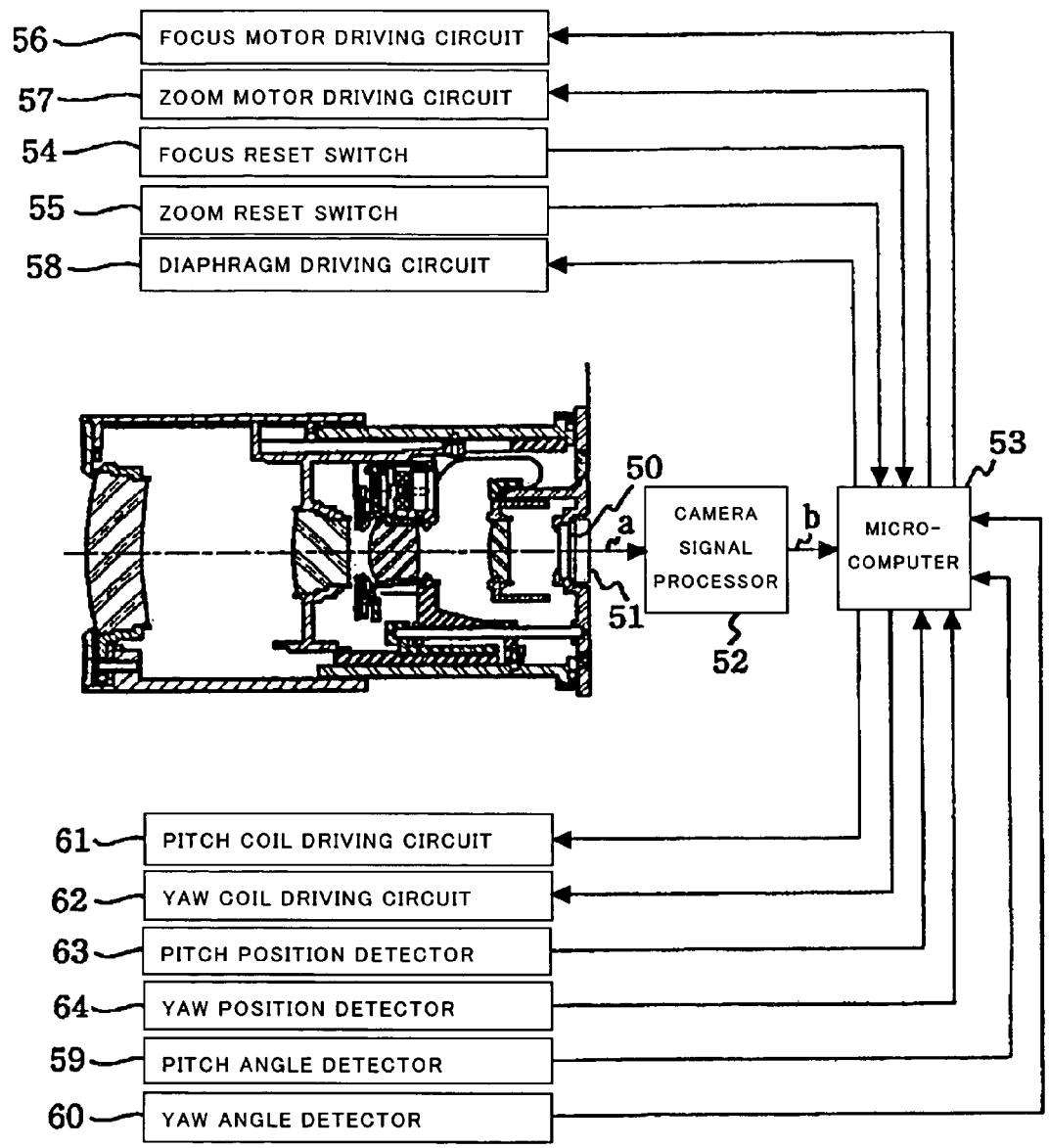
FIG. 9 is a block diagram showing a camera equipped with the lens barrel of the embodiment.

FIG. 9 is a block diagram showing a camera equipped with the lens barrel of this embodiment.

In FIG. 9, 50 denotes an optical filter eliminating a high spatial frequency component of the luminous flux from an object and cutting an infrared light. The optical filter 50 is fixed to the lens barrel of this embodiment.

51 denotes an image-pickup element such as a CCD sensor or a CMOS sensor. The image-pickup element 51 photoelectrically converts an object image (optical image) formed by the image-taking optical system in the lens barrel into electronic signals. A camera signal processor 52 performs predetermined processing such as color correction and gamma correction on the electronic signals 'a' read out from the image-pickup element 51 to generate image signals 'b'.

The image signals 'b' are recorded on a recording medium, and are output to a display unit to display a taken image.

53 denotes a microcomputer controlling the whole operation of the camera including the operation of the lens barrel. After the power of the camera is on, the microcomputer 53 moves each lens unit in the optical axis direction while monitoring the output of the focus reset switch 54 corresponding to the photoelectric detector 16 and the output of the zoom reset switch 55 corresponding to the photoelectric detector 17.

The microcomputer 53 can move each lens unit in the optical axis direction by controlling the drive of the focus motor 14 and zoom motor 15 via a focus motor driving circuit 56 and a zoom motor driving circuit 57.

When the fourth lens unit L4 reaches its reference position, in other words, the photoelectric detector 16 is changed from the light-receiving state to the light-shielding state by the light-shielding portion 4c formed on the fourth barrel 4, the output of the focus reset switch 54 is changed. The microcomputer 53 determines that the fourth lens unit L4 has reached the reference position by detecting the change of the output of the focus reset switch 54.

When the first to third lens units L1 to L3 reach their reference positions, in other words, the photoelectric detector 17 is changed from the light-receiving state to the light-shielding state by the light-shielding portion 18a formed on the lever 18, the output of the zoom reset switch 55 is changed. The microcomputer 53 determines that the first to third lens units L1 to L3 have reached the reference position by detecting the change of the output of the zoom reset switch 55.

In a case where stepping motors are used as the focus motor 14 and zoom motor 15, the microcomputer 53 can detect an absolute position of each of the lens units L1 to L4 by counting driving pulses input to the stepping motor after the determination of the reference position. Thereby, it is possible to obtain accurate focal length information and focus information of the image-taking optical system.

On the other hand, the microcomputer 53 controls the diaphragm unit 13 via a diaphragm driving circuit 58. In other words, the microcomputer 53 controls the aperture diameter of the diaphragm unit 13 based on luminance information included in the image signals 'b' generated by the camera signal processor 52.

59 and 60 denote a PITCH angle detector detecting a tilt angle in a pitch direction (vertical direction) and a YAW angle detector detecting a tilt angle in a yaw direction (horizontal direction), respectively. The detection of the tilt angles is performed by integrating the output of an angular speed sensor such as a vibration gyro, which is fixed in the camera.

The microcomputer 53 loads the output of the PITCH angle detector 59 and YAW angle detector 60, or the tilt angle information of the camera.

61 and 62 denote a PITCH coil driving circuit and a YAW coil driving circuit, respectively, the circuits 61 and 62 being for driving the third lens unit L3 in a plane orthogonal to the optical axis. The shift unit 3 has a so-called moving magnet structure in which a magnet is fixed on the base of the shift unit 3 and a coil is moved together with the third lens unit L3. The coil and magnet generate driving force for shifting the third lens unit L3 in the plane orthogonal to the optical axis.

63 and 64 denote a PITCH position detector detecting a shift amount of the third lens unit L3 in the pitch direction and a YAW position detector detecting a shift amount of the third lens unit L3 in the yaw direction, respectively. The output of the position detectors 63 and 64 are input to the microcomputer 53.

The shift of the third lens unit L3 in the plane orthogonal to the optical axis bends the luminous flux passing through the third lens unit L3, and thereby the position of the object image formed on the image-pickup element 51 is shifted.

When the camera is shaken, by controlling the drive of the third lens unit L3 so that the object image may be shifted by an amount corresponding to the tilt angle detected by the angle detectors 59 and 60 in a direction opposite to the direction detected by them, the movement of the object image on the pickup surface of the image-pickup element 51 is suppressed. Thereby, it is possible to achieve so-called image stabilization which stabilizes the object image on the image plane even if the camera is shaken.

The microcomputer 53 calculates the difference between tilt signals indicating the camera's tilt, which are obtained from the PITCH and YAW angle detectors 59 and 60, and shift amount signals indicating the position of the third lens unit L3, which are obtained from the PITCH and YAW position detectors 63 and 64, respectively. Then, the microcomputer 53 performs amplification and phase compensation on the difference signals to generate driving signals, and controls the drive of the third lens unit L3 based on the driving signals via the PITCH and YAW coil driving circuits 61 and 62.

According to this, the positioning control is performed so that the difference signal may reduce, thereby driving the third lens unit L3 continuously to target positions for correcting image vibration.

On the other hand, in this embodiment, since the magnification varying operation is performed by the relative movement of the first to third lens units L1 to L3, the movement amount of the object image to the shift amount of the third lens units L3 changes according to the focal length.

Therefore, in this embodiment, the shift amount (correction amount) of the third lens units L3 is determined after the tilt signals are corrected based on the focal length information without determining the shift amount of the third lens units L3 directly from the tilt signals detected by the PITCH and YAW angle detectors 59 and 60. Thereby, it is possible to perform the image stabilization according to the focal length of the image-taking optical system.

In the above-mentioned embodiment, the description of the camera with lens was made. However, the present invention can be applied to a lens apparatus included in a camera system constituted by a camera and the lens apparatus mounted on the camera.

This application claims foreign priority benefits based on Japanese Patent Application No. 2004-229034, filed on Aug. 5, 2004, which is hereby incorporated by reference herein in its entirety as if fully set forth herein.

What is claimed is:

1. A lens apparatus comprising:
   a first member which includes a first protruding portion and a second protruding portion; and
   a second member which includes a first groove portion with which the first protruding portion engages, and a second groove portion into which the second protruding portion is inserted,
   wherein the second protruding portion and the second groove portion are away from each other in a case where the first and second members are located in a specified positional relationship in a direction orthogonal to an optical axis, and come into contact with each other in a case where the first and second members are located in a positional relationship other than the specified positional relationship,
   wherein the first and second members are moved relatively in a direction of the optical axis by their relative rotation, and
   wherein the first and second protruding portions are formed alternately in the direction of the relative rotation.

2. The lens apparatus according to claim 1, wherein the first and second groove portions are formed away from each other in the second member.

3. An image-taking apparatus comprising:
   the lens apparatus according to claim 1; and
   a photoelectrical conversion element which converts an object image formed by the lens apparatus into an electronic signal.

4. The lens apparatus according to claim 1, wherein the first and second protruding portions are formed alternately and equiangularly in the direction of the relative rotation.

* * * * *